(12) United States Patent
Nagasawa

(10) Patent No.: US 12,017,603 B2
(45) Date of Patent: Jun. 25, 2024

(54) EXTERIOR PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 457 days.

(21) Appl. No.: 17/448,473

(22) Filed: Sep. 22, 2021

(65) Prior Publication Data

US 2022/0097647 A1 Mar. 31, 2022

(30) Foreign Application Priority Data

Sep. 25, 2020 (JP) .................. 2020-160284

(51) Int. Cl.
    *B60R 21/36* (2011.01)
(52) U.S. Cl.
    CPC ..................... *B60R 21/36* (2013.01)
(58) Field of Classification Search
    CPC ............................. B60R 21/36; B60R 21/34
    See application file for complete search history.

(56) References Cited

U.S. PATENT DOCUMENTS

| | | | |
|---|---|---|---|
| 2009/0289471 A1 | 11/2009 | Finney | |
| 2017/0282845 A1* | 10/2017 | Nagasawa | |
| 2019/0366972 A1 | 12/2019 | Nakamura et al. | |
| 2019/0375368 A1* | 12/2019 | Kanno | |

FOREIGN PATENT DOCUMENTS

| | | |
|---|---|---|
| DE | 101 61 873 A1 | 7/2003 |
| JP | 7-125604 A | 5/1995 |
| JP | 8-183423 A | 7/1996 |
| JP | 2005-206103 A | 8/2005 |
| JP | 2006-298153 A | 11/2006 |
| JP | 2009-166545 A | 7/2009 |
| JP | 2017-178205 A | 10/2017 |
| JP | 2019-209825 A | 12/2019 |
| KR | 10-2019-0059844 A | 5/2019 |

OTHER PUBLICATIONS

Notice of Reasons for Refusal issued in Japanese Patent Application No. 2020-160284 dated Jan. 30, 2024, with machine translation.

* cited by examiner

*Primary Examiner* — James A Shriver, II
*Assistant Examiner* — Nicholas R. Kandas
(74) *Attorney, Agent, or Firm* — TROUTMAN PEPPER HAMILTON SANDERS LLP

(57) ABSTRACT

An exterior protection apparatus includes an exterior airbag device, a collision detector, a controller, and engaging members. The exterior airbag device includes a bag body, and an inflator that expands the bag body rearward from a front part of a vehicle body of a vehicle so as to overlie a hood of the vehicle body. The collision detector predicts or detects contact between the vehicle body and a movable body. The controller causes the exterior airbag device to be expanded when the collision detector predicts or detects the contact. The engaging members are disposed in a vehicle width direction at the front part. The engaging members engage with the expanded bag body. At least the engaging members at both ends in the vehicle width direction are disengageable from the bag body when a load component in the vehicle width direction acts on the bag body.

19 Claims, 12 Drawing Sheets

EXTERIOR PROTECTION APPARATUS FOR VEHICLE

CROSS-REFERENCE TO RELATED APPLICATION

The present application claims priority from Japanese Patent Application No. 2020-160284 filed on Sep. 25, 2020, the entire contents of which are hereby incorporated by reference.

BACKGROUND

The disclosure relates to an exterior protection apparatus of a vehicle.

There may exist other movable bodies, pedestrians, cyclists, riders, etc., on roads and other locations outside a vehicle. The vehicle may possibly collide with such a person outside the vehicle or the like, during traveling, stopping, or parking. In consideration of this, installing an exterior protection apparatus to a vehicle has been studied (Japanese Unexamined Patent Application Publication (JP-A) No. 2017-178205).

SUMMARY

An aspect of the disclosure provides an exterior protection apparatus for a vehicle including an exterior airbag device, a collision detector, a controller, and engaging members. The exterior airbag device includes a bag body, and an inflator configured to expand the bag body rearward from a front part of a vehicle body of the vehicle in such a manner as to overlie a hood of the vehicle body. The collision detector is configured to predict or detect contact between the vehicle body and a movable body. The controller is configured to cause the exterior airbag device to be expanded in a case where the collision detector predicts or detects the contact. The engaging members are disposed in a vehicle width direction at the front part of the vehicle body. The engaging members are configured to engage with the bag body in a case the bag body is expanded rearward from the front part of the vehicle body. At least the engaging members at both ends in the vehicle width direction among the engaging members are disengageable from the bag body in a case where a load component in the vehicle width direction acts on the bag body.

An aspect of the disclosure provides an exterior protection apparatus for a vehicle including an exterior airbag device, a collision detector, circuitry, and engaging members. The exterior airbag device includes a bag body, and an inflator configured to expand the bag body rearward from a front part of a vehicle body of the vehicle in such a manner as to overlie a hood of the vehicle body. The collision detector is configured to predict or detect contact between the vehicle body and a movable body. The collision detector includes at least a camera or a sensor for detecting the contact between the vehicle body and the movable body. The circuitry is configured to cause the exterior airbag device to be expanded in a case where the collision detector predicts or detects the contact. The engaging members are disposed in a vehicle width direction at the front part of the vehicle body. The engaging members are configured to engage with the bag body in a case the bag body is expanded rearward from the front part of the vehicle body. At least the engaging members at both ends in the vehicle width direction among the engaging members are disengageable from the bag body in a case where a load component in the vehicle width direction acts on the bag body.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

As to vehicles, there are ideas to expand an airbag for a person outside a vehicle, for example, on a hood, or in front of a windshield or a pillar at each right and left part of the windshield, instead of moving a hood as in JP-A No. 2017-178205. Employing such an exterior airbag device enables avoiding a direct collision of a person outside the vehicle with a vehicle body.

However, this may not be enough to protect a person outside a vehicle.

An exterior protection apparatus of a vehicle is desired to be further improved for protecting a person outside a vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1A:
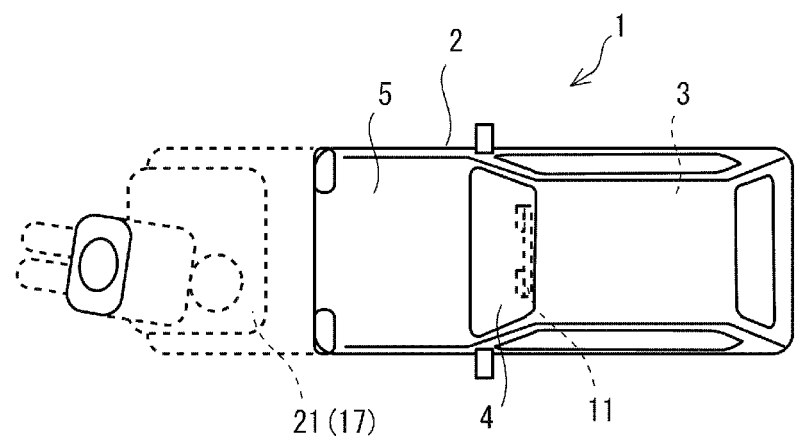
FIGS. 1A and 1B are diagrams of an automobile according to an embodiment of the disclosure.
Figure 1B:
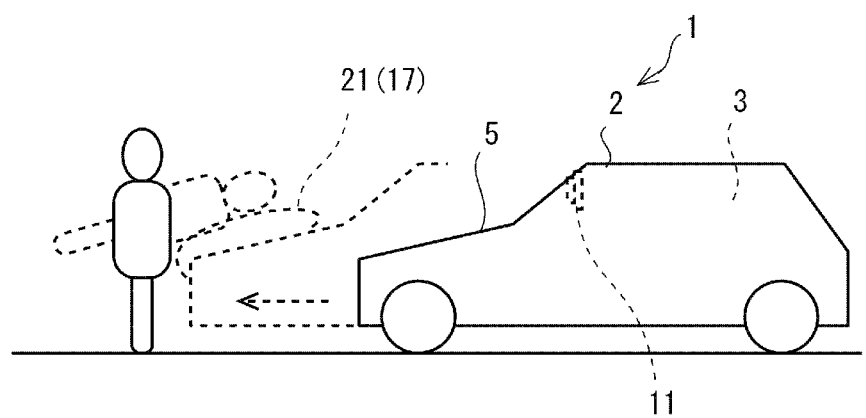

FIGS. 1A and 1B are diagrams of an automobile 1 according to an embodiment of the disclosure.

FIG. 1A is a top view of the automobile 1. FIG. 1B is a left side view of the automobile 1. FIGS. 1A and 1B illustrate a pedestrian as a person outside the automobile 1, in addition to the automobile 1. There may be cases in which a person other than the pedestrian, such as a cyclist or a rider, exists outside the automobile 1. Such a person outside the vehicle may cross a road in front of the automobile 1 that is travelling, in some cases. The automobile 1 may possibly collide with the person about to pass in front thereof.

The automobile 1 in FIGS. 1A and 1B is an example of a vehicle. The automobile 1 includes a vehicle body 2. A windshield 4 is provided in front of a vehicle cabin 3 of the vehicle body 2. A hood 5 is openably and closably provided in a front part of the vehicle body 2 forward of the windshield 4.

Figure 2:
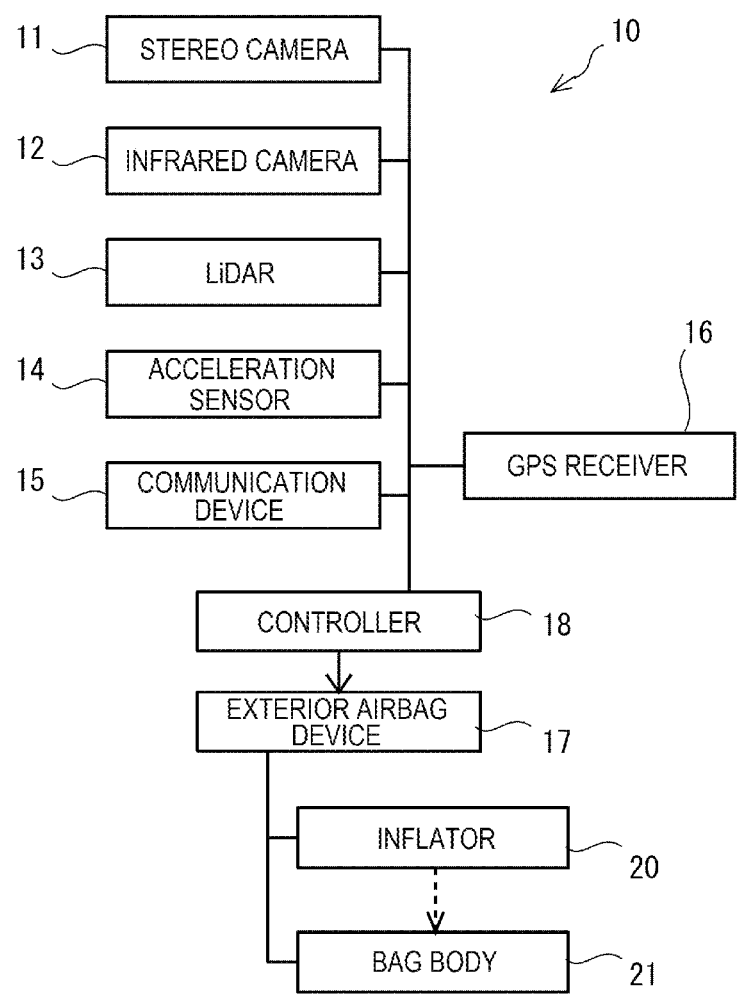
FIG. 2 is a block diagram of an exterior protection apparatus of the automobile in FIGS. 1A and 1B.

FIG. 2 is a block diagram of an exterior protection apparatus 10 of the automobile 1 in FIGS. 1A and 1B.

The exterior protection apparatus 10 in FIG. 2 includes a stereo camera 11, an infrared camera 12, a LiDAR 13, an acceleration sensor 14, a communication device 15, a GPS receiver 16, an exterior airbag device 17, and a controller 18 to which these components are coupled. These sensors and devices of the exterior protection apparatus 10 may be coupled to a CPU serving as the controller 18, over a vehicle network (not illustrated).

The stereo camera 11 faces forward, for example, at a front part of the vehicle cabin 3, as illustrated in FIGS. 1A and 1B. The stereo camera 11 includes a plurality of imaging devices arranged in the vehicle width direction. The stereo camera 11 captures images of a person and so on outside the vehicle by the plurality of the imaging devices. The stereo camera 11 may calculate a direction and a distance based on the vehicle body 2 of the captured person outside the vehicle. The stereo camera 11 may calculate, based on a position of the person outside the vehicle that is a subject in images captured by the plurality of the imaging devices, the direction and the distance to the subject by triangulation, for example. The stereo camera 11 may calculate (i) whether the subject moves, (ii) a moving direction of the subject, (iii) a moving speed of the subject, and the like, based on a change in position of the subject in the images which are captured at different times.

The infrared camera 12 faces forward at the front part of the vehicle cabin 3, like the stereo camera 11, for example. The infrared camera 12 obtains infrared images by capturing a person and so on outside the vehicle.

The LiDAR 13 faces forward, for example, at the front part of the vehicle body 2. The LiDAR 13 emits light forward, and acquires a direction of a subject, a distance to the subject, the speed of the subject, and the like, based on light reflected from the person outside the vehicle ahead of the vehicle body 2.

The acceleration sensor 14 is provided on the vehicle body 2. Acceleration that is applied to the acceleration sensor 14 is detected. When the vehicle body 2 comes into contact with a movable body, such as a person, the acceleration sensor 14 detects a large acceleration that does not occur during normal running. In this situation, the acceleration sensor 14 may output a collision detection signal. In one embodiment, the acceleration sensor 14 may serve as a "collision detector" and predict or detect contact between the vehicle body 2 and other movable body.

The communication device 15 wirelessly communicates with other communication devices 15 of other movable bodies (for example, other automobile 1 and a pedestrian), a base station disposed along a road, and the like. The communication device 15 may acquire current positions, moving directions, moving speeds, and the like, of the other movable bodies from the other communication devices 15.

The GPS receiver 16 receives a radio wave from a GPS satellite and the like, and acquires a current position, a moving speed, and the like, of the own vehicle.

The exterior airbag device 17 includes a bag body 21 and an inflator 20. The bag body 21 is configured to be expanded over an outer surface of the vehicle body 2 of the automobile 1. The inflator 20 expands the bag body 21. The bag body 21 may have a smooth surface formed of, for example, at least one selected from the group consisting of nylon and other resin fibers. The bag body 21 may be expanded on the hood 5 at the front part of the vehicle body 2, for example, as illustrated in FIGS. 1A and 1B. In a situation in which an upper part of the body of a person outside the vehicle, who is hit by the forefront of the vehicle body 2, falls over to the front part of the vehicle body 2, the bag body 21 is expanded on the hood 5 between the upper body and the hood 5. Thus, the body of the person outside the vehicle, who is hit by the vehicle body 2, hardly comes into direct contact with the hood 5. The expanded bag body 21 is bent or compressed by the body weight of the person outside the vehicle, whereby a strong impact hardly acts on the human body. The expanded bag body 21 absorbs an impact that acts on the person outside the vehicle.

The controller 18 is, for example, a CPU. For example, the controller 18 may be provided in the automobile 1 as a CPU dedicated to the exterior airbag device 17 or may be provided in the automobile 1 as a CPU of vehicle interior and exterior protection devices of the automobile 1. The CPU reads and executes a program in a storage, such as a ROM. Thus, the CPU serves as the controller 18 of at least the exterior airbag device 17 for protecting a person outside the vehicle. The controller 18 of the exterior airbag device 17 acquires information of a pedestrian, a cyclist, a rider, and so on, who are in the course of the automobile 1 or are about to enter the course of the automobile 1, from collision detectors such as the stereo camera 11, the infrared camera 12, the LiDAR 13, the acceleration sensor 14, and the communication device 15. Upon predicting or detecting contact with a person outside the vehicle based on the acquired information, the CPU controls expansion of the bag body 21 of the exterior airbag device 17.

Figure 3:
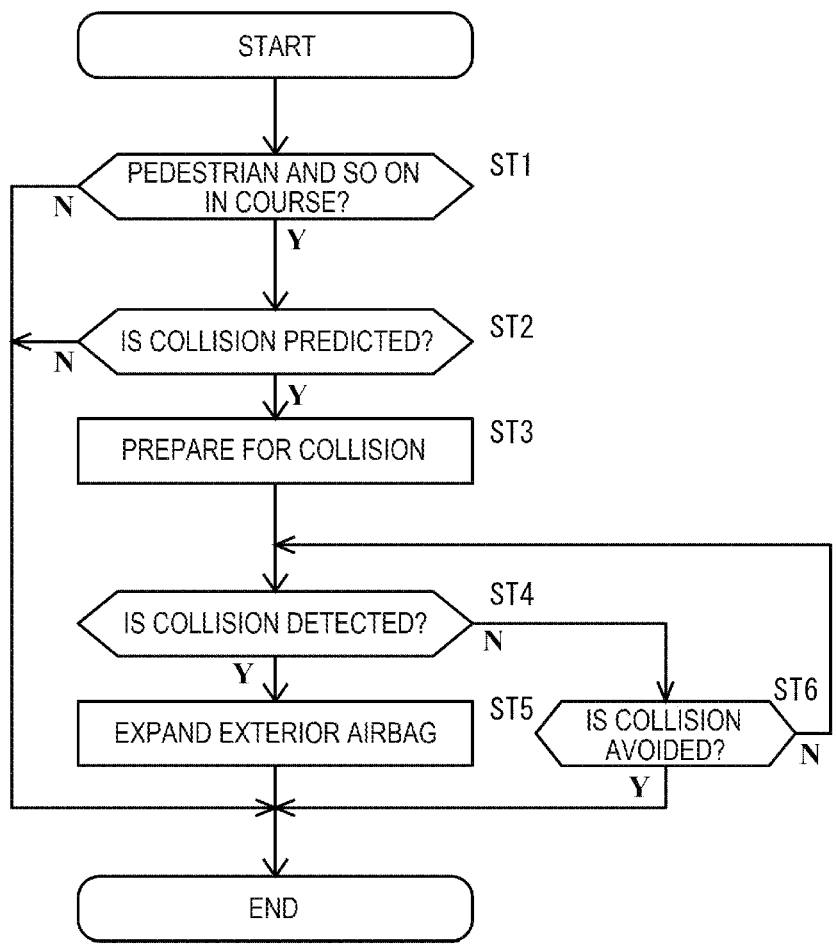
FIG. 3 is a flowchart of exterior protection control performed by a controller in FIG. 2.

FIG. 3 is a flowchart of exterior protection control performed by the controller 18 in FIG. 2.

The controller 18 repeats the exterior protection control in FIG. 3, for example, when the automobile 1 is traveling. The controller 18 executes the exterior protection control in FIG. 3 each time of acquiring new information.

In step ST1, the controller 18 determines whether a pedestrian or the like exists in the course of the own vehicle, based on newly acquired information of persons outside the vehicle. The controller 18 may determine whether a pedestrian or the like exists in the course of the own vehicle, for example, based on whether the position of a detected person outside the vehicle is in the course, or whether the moving direction of a detected person outside the vehicle crosses the course. When no pedestrian or the like exists in the course of the own vehicle, the controller 18 terminates the processing in FIG. 3. When a pedestrian or the like exists in the course of the own vehicle, the controller 18 advances the processing to step ST2.

In step ST2, the controller 18 predicts collision with a pedestrian or the like in the course of the own vehicle. The controller 18 may predict collision with a pedestrian or the like in the course of the own vehicle, for example, based on whether a difference between the time at which the own vehicle reaches the position of the pedestrian or the position expected to be crossed by the pedestrian, and the time at which the pedestrian reaches the crossing position, is a predetermined value or less. In the case of not predicting collision with the pedestrian or the like in the course of the own vehicle, the controller 18 terminates the processing in FIG. 3. In the case of predicting collision with the pedestrian or the like in the course of the own vehicle, the controller 18 advances the processing to step ST3.

In step ST3, the controller 18 starts preparation for collision with the pedestrian or the like in the course of the own vehicle. The controller 18 activates the exterior airbag device 17, for example. The exterior airbag device 17 prepares the inflator 20 to jet high-temperature high-pressure gas, for example, in response to an input ignition signal. For example, the exterior airbag device 17 adjusts an expansion start position or an expansion start direction of the bag body 21, if adjustable, so that the bag body 21 will be expanded at a part that is predicted to collide with the pedestrian.

In step ST4, the controller 18 detects the predicted collision with the pedestrian or the like, based on detection of collision performed by the acceleration sensor 14. When collision is detected by the acceleration sensor 14, the controller 18 advances to the processing to step ST5. When no collision is detected by the acceleration sensor 14, the controller 18 advances to the processing to step ST6.

In step ST5, the controller 18 expands the bag body 21. The controller 18 outputs an ignition signal to the exterior airbag device 17. The inflator 20 of the exterior airbag device 17 jets the high-pressure gas into the bag body 21. The bag body 21 is thus expanded on the hood 5.

In step ST6, the controller 18 determines whether the collision is avoided, based on information that is newly acquired after the determination in step ST1. The controller may determine whether the predicted collision with the pedestrian or the like is avoided, for example, based on whether the position of the person outside the vehicle, who is predicted to collide, deviates the course, or whether the moving direction of the detected person outside the vehicle is changed so as to not cross the course. When the collision is avoided, the controller 18 terminates the processing in FIG. 3. When the collision is not avoided, the controller 18 returns the processing to step ST4. Then, the controller 18 repeats the processing in steps ST4 and ST6 until the collision is detected or avoided.

Such an automobile 1 of this embodiment can expand an airbag for a person outside the vehicle, on the hood 5. Employing such an exterior airbag device 17 enables avoiding a direct collision of a person outside the vehicle with the vehicle body 2.

However, this may not be enough to protect a person outside a vehicle.

In one example, after a direct collision of a person outside the vehicle with the vehicle body 2 is avoided by the expanded bag body 21, the person is anticipated to move from the expanded bag body 21, resulting in falling off from the hood 5. In the case of falling down to a side of the automobile 1, the person outside the vehicle may have a secondary collision with another automobile 1 that is traveling in an adjacent lane, or the like.

Figure 4:
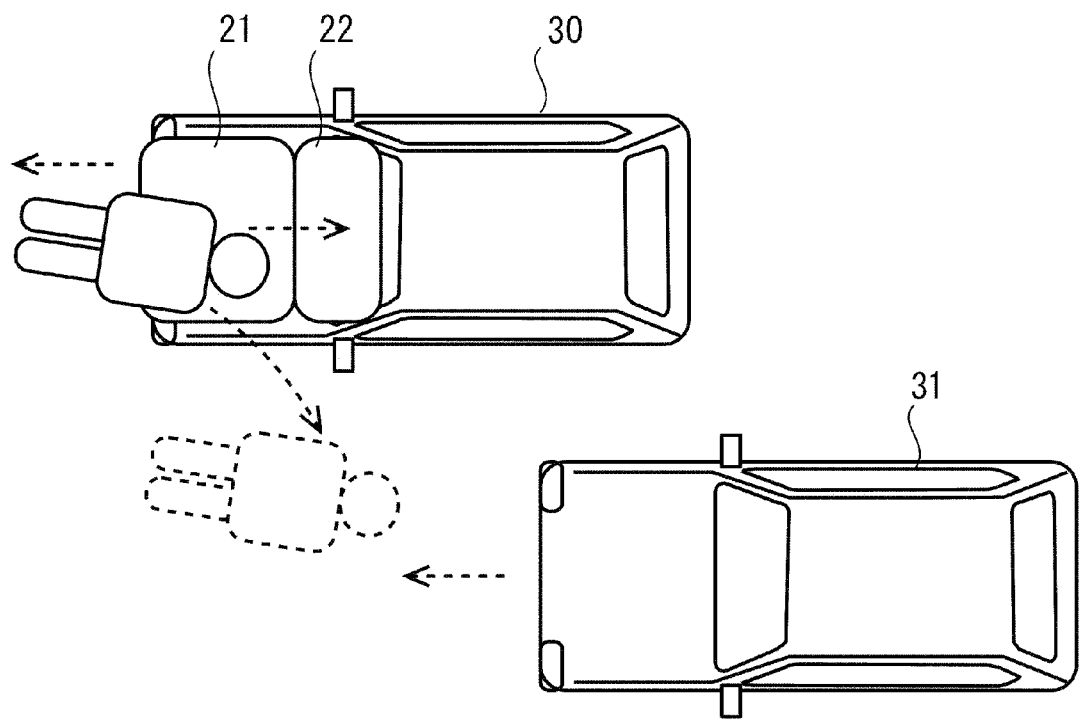
FIG. 4 is a diagram of a secondary collision that may occur on a person outside the vehicle, such as a pedestrian or a cyclist, who has collided with a first automobile.

FIG. 4 is a diagram of a secondary collision that may occur on a person outside the vehicle, such as a pedestrian or a cyclist, who has collided with a first automobile 30.

FIG. 4 illustrates a pedestrian outside the vehicle, a first automobile 30 having collided with the pedestrian, and a second automobile 31 that is about to pass beside the first automobile 30.

The pedestrian that has collided with the first automobile 30 is expected to ride onto the bag body 21 expanded on the hood 5, first. Then, the pedestrian having the collision may, for example, slide on the bag body 21 rearward. In this case, the pedestrian having the collision may come into contact with another bag body 22 that is expanded in front of the windshield 4 and may be able to stop at the contact position. In another case, after riding onto the bag body 21 expanded on the hood 5, the pedestrian having the collision may move obliquely rearward due to the immediately prior movement in the direction of crossing the vehicle, and so on. In this situation, the pedestrian having the collision, who moves greatly in the vehicle width direction, may fall off from the hood 5 to a side of the first automobile 30. The pedestrian who has fallen down may be further hit by the second automobile 31 that is about to pass beside the first automobile 30.

In view of this, the exterior protection apparatus 10 of the automobile 1 is desired to be further improved for protecting a person outside the vehicle.

Figure 5A:
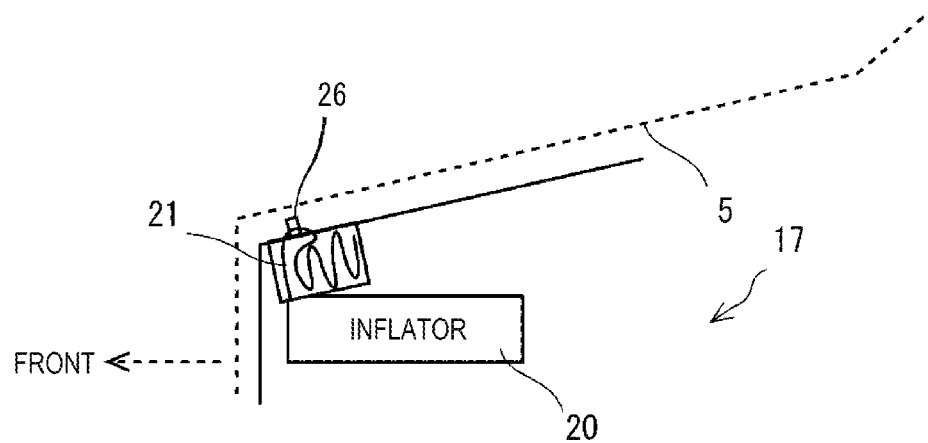
FIGS. 5A and 5B are diagrams of an exterior airbag device according to a first embodiment of the disclosure.
Figure 5B:
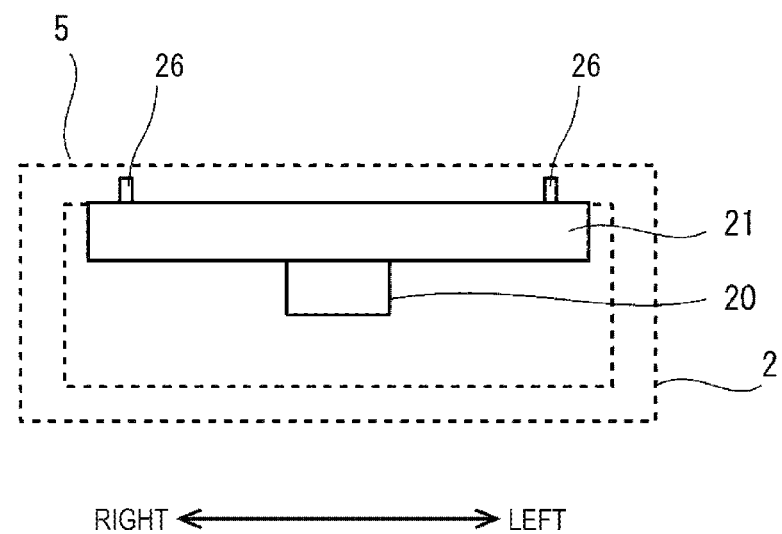

FIGS. 5A and 5B are diagrams of the exterior airbag device 17 according to the first embodiment of the disclosure. FIG. 5A is a side view of a front part of the vehicle body 2. FIG. 5B is a front view of a front part of the vehicle body 2.

Figure 6A:
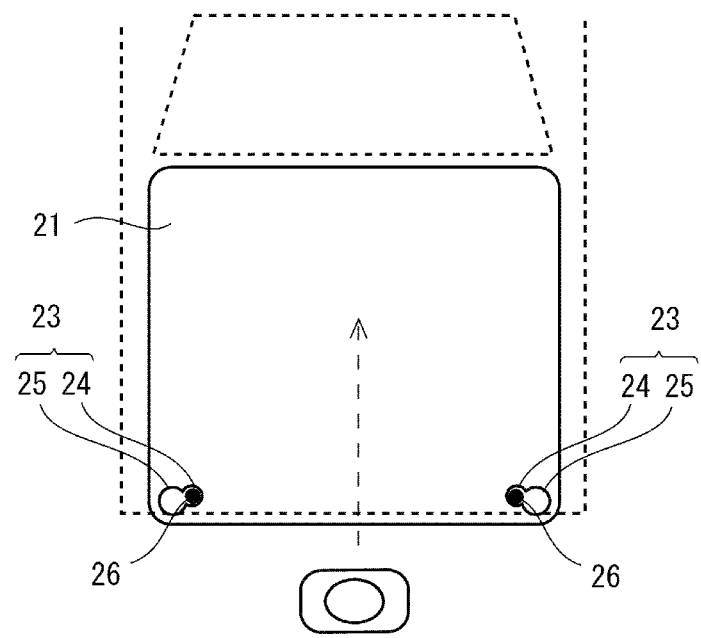
FIGS. 6A and 6B are diagrams of the exterior airbag device in FIGS. 5A and 5B, in which a bag body is expanded.
Figure 6B:
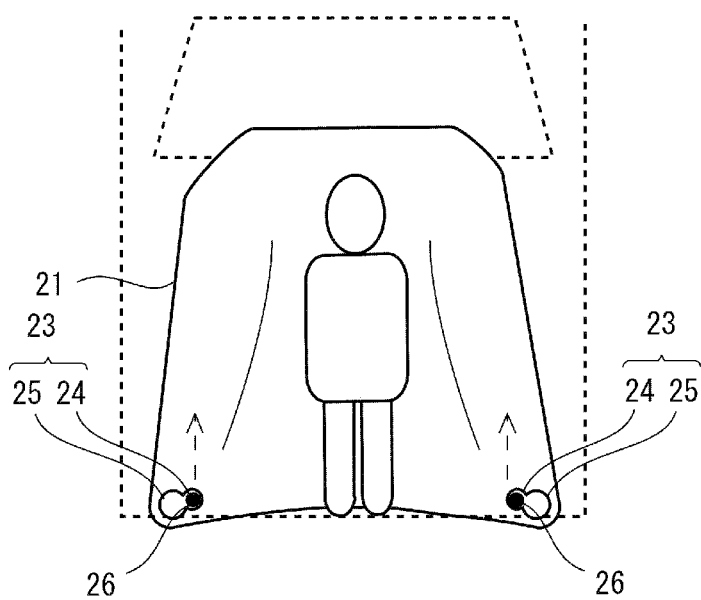

FIGS. 6A and 6B are diagrams of the exterior airbag device 17 in FIGS. 5A and 5B, in which the bag body 21 is expanded. FIGS. 6A and 6B are top views of the front part of the vehicle body 2.

The bag body 21 of the exterior airbag device 17 has an approximately quadrangular bag shape, as illustrated in FIG. 6A. The approximately quadrangular bag body 21 has a wide width approximately equal to the vehicle width of the vehicle body 2. The approximately quadrangular wide bag body 21 is folded in an oblong case that is mounted to a frame at the front part of the vehicle body 2, as illustrated in FIG. 5A. The inflator 20 is provided close to the oblong case. The inflator 20 is coupled to the approximately quadrangular wide bag body and jets high-temperature high-pressure gas into the bag body 21. This expands the folded bag body 21 rearward from the front part of the vehicle body 2 in such a manner as to overlie the hood 5 of the vehicle body 2. The bag body 21 is expanded so as to cover the whole hood 5.

As illustrated in FIGS. 5A to 6B, a plurality of columnar engaging members 26 stand on a frame at the front part of the vehicle body 2 and are arranged along the vehicle width direction. A turn may be provided at an upper part of the engaging member 26.

A front edge part of the approximately quadrangular wide bag body 21 has a plurality of engaging holes 23 that are arranged along the vehicle width direction so as to engage with the engaging members 26. In FIGS. 5A to 6B, two pairs of the engaging members 26 and the engaging holes 23 are provided.

Each of the engaging holes 23 has a first hole 24 and a second hole 25 that communicates with the first hole 24. The first hole 24 has a diameter approximately equal to or smaller than that of the columnar engaging member 26. The second hole 25 has a diameter larger than that of the columnar engaging member 26. When a turn is provided at an upper part of the engaging member 26, the second hole 25 may have a diameter larger than the turn of the engaging member 26. This structure allows the right and left engaging members 26 to come off and be disengaged from the right and left engaging holes 23 at the second holes 25.

As to the right engaging hole 23, the second hole 25 is at a position displaced right, outwardly in the vehicle width direction from the first hole 24. With this structure, the right engaging hole 23 is disengageable from the right engaging member 26 by strongly pulling rearward a part right side from a center in the vehicle width direction of the bag body 21.

As to the left engaging hole 23, the second hole 25 is at a position displaced left, outwardly in the vehicle width direction from the first hole 24. With this structure, the left engaging hole 23 is disengageable from the left engaging member 26 by strongly pulling rearward a part on the left side from a center in the vehicle width direction of the bag body 21.

The bag body 21, which is folded as in FIG. 5A, is expanded by the control of the controller 18, in response to prediction or detection of collision with a person outside the vehicle. The bag body 21, which is contained in a folded manner, is inflated by the high-temperature high-pressure gas from the inflator 20 to be expanded in such a manner as to overlie the hood 5 of the vehicle body 2. The approximately quadrangular wide bag body 21 is expanded so as to cover the whole hood 5, as illustrated in FIGS. 6A and 6B.

Then, as illustrated in FIG. 6A, the person outside the vehicle in front of the vehicle body 2 comes into contact with the forefront of the vehicle body 2. The person outside the vehicle, who comes into contact with the vehicle, falls over the approximately quadrangular wide bag body 21 that is expanded so as to cover the whole hood 5, as illustrated in FIG. 6B. The approximately quadrangular wide bag body 21 that is expanded to the maximum is compressed by the weight of the person outside the vehicle, who falls thereover, and so on. The bag body 21 is compressed while discharging the injected gas. Thereafter, the approximately quadrangular wide bag body 21 deforms in such a manner as to wrap the person outside the vehicle sinking therein, from right and left, due to the person outside the vehicle falling thereover.

At this time, the approximately quadrangular wide bag body 21, which is expanded rearward from the front part of the vehicle body 2 while engaging with the plurality of the engaging members 26, resists a rearward load acting thereon.

Thus, the approximately quadrangular wide bag body 21 absorbs impact acting on the person outside the vehicle, in the state of wrapping the person outside the vehicle rearwardly falling thereover, from right and left.

Figure 7A:
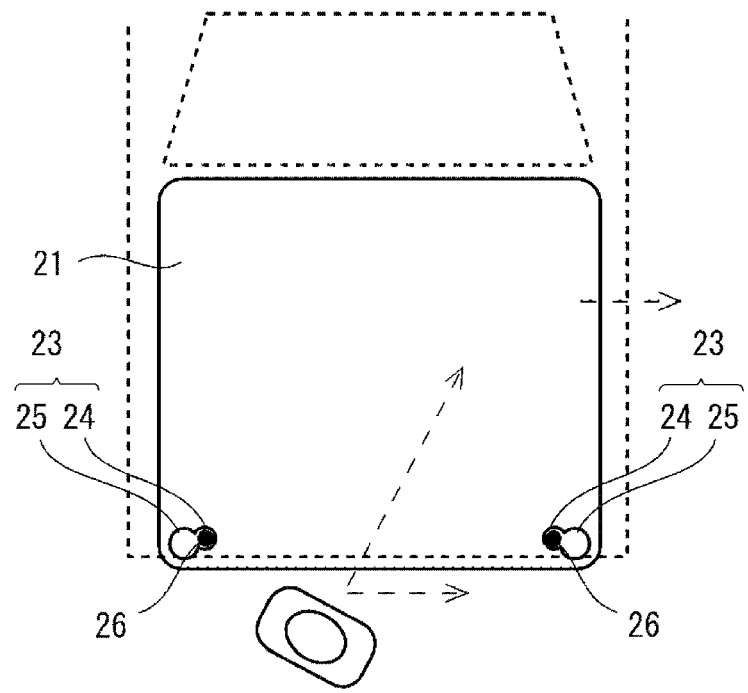
FIGS. 7A and 7B are diagrams of the exterior airbag device according to the first embodiment, in a state of protecting a person outside the vehicle.
Figure 7B:
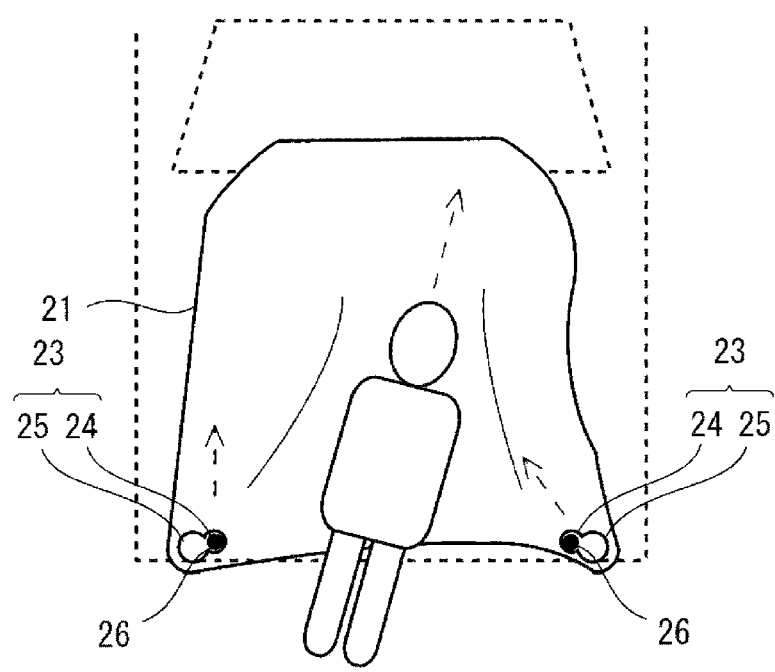
Figure 8A:
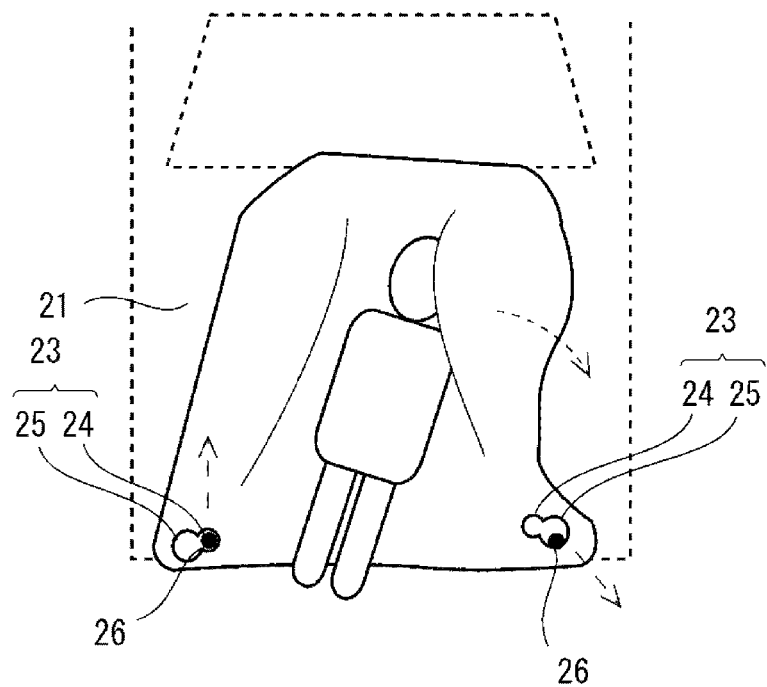
FIGS. 8A and 8B are diagrams following FIGS. 7A and 7B.
Figure 8B:
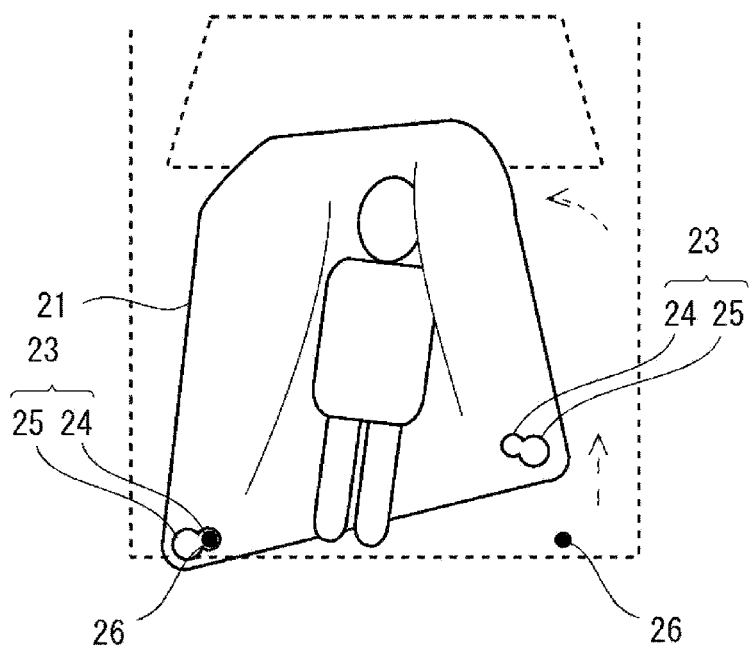

FIGS. 7A and 7B are diagrams of the exterior airbag device 17 in FIGS. 5A and 5B, in which the bag body 21 is expanded. FIGS. 8A and 8B are diagrams following FIGS. 7A and 7B. The person outside the vehicle falls over obliquely rearward from the forefront of the vehicle body 2, unlike the case in FIGS. 6A and 6B.

In this situation, an oblique rearward load acts on the approximately quadrangular wide bag body 21 over which the person outside the vehicle falls. In FIG. 7A, a load having a leftward component strongly acts on a left part close to the center in the vehicle width direction of the bag body 21. When a person outside the vehicle falls over the bag body 21, first, a rearward force acts on the part on the left side from the center in the vehicle width direction of the bag body 21, in a manner similar to that on the right part. However, as time elapses after the person outside the vehicle falls over, the person outside the vehicle also moves leftward in the state of falling over, while maintaining impetus generated in falling over. In response to this, as illustrated in FIG. 7B, the left engaging member 26 moves from the first hole 24 to the second hole 25 of the left engaging hole 23, which is on a side of the falling over direction.

The approximately quadrangular wide bag body 21 that is expanded to the maximum is then compressed by the weight of the person outside the vehicle, who falls thereover, and so on. The bag body 21 is compressed while discharging the injected gas. As illustrated in FIG. 8A, due to the person outside the vehicle who is about to also move leftward in the state of falling over, the left part of the approximately quadrangular wide bag body 21 is loosened and twisted. In addition, the whole approximately quadrangular wide bag body 21 is to be rotated toward the left in a clockwise direction by impetus of the person outside the vehicle falling thereover. The combination of these actions can yield a force acting to push the left engaging hole 23 in an oblique forward direction. The left engaging member 26 comes off from the second hole 25 of the left engaging hole 23.

In response to disengagement between the left engaging hole 23 and the left engaging member 26, the expanded bag body 21 becomes movable in such a manner as to rotate rearward around the right engaging member 26 that is still engaged. Thus, as illustrated in FIG. 8B, when the person outside the vehicle in the state of obliquely falling over the expanded bag body 21 is about to further move in the falling over direction, the bag body 21 rotates rearward accordingly. Although being about to further move in the falling over direction due to inertia, the person outside the vehicle hardly moves from the falling over position toward the outside in the vehicle width direction, due to the bag body 21 rotating rearward in the counter direction. The person outside the vehicle begins to move rearward of the vehicle body 2.

In particular, an outer part of the position of the expanded bag body 21 where the person outside the vehicle falls over, is disengaged from the engaging member 26 and is thus not pulled in the front-rear direction, resulting in not being flattened. This facilitates maintaining the expanded bag body 21 in the state of being inflated in such a manner as to be higher than the body of the person outside the vehicle falling thereover. The inflated bag body 21 serves as a bank for preventing the person outside the vehicle falling thereover from moving further outward. The person outside the vehicle can be wrapped in the part of the bag body 21 that is still inflated on the outer side of the person.

As a result, the person outside the vehicle, who falls obliquely over the expanded bag body 21, is wrapped from right and left, in a manner similar to that in the case of falling over the bag body 21 along the front-rear direction. The person outside the vehicle hardly falls off from the expanded bag body 21. The person outside the vehicle, who is avoided from having a direct collision with the vehicle body 2 by the expanded bag body 21, can be prevented from moving right and left of the expanded bag body 21.

At this time, the approximately quadrangular wide bag body 21, which is expanded rearward from the front part of the vehicle body 2 while engaging with the remaining right engaging member 26, resists an oblique rearward load acting thereon.

Thus, the approximately quadrangular wide bag body 21 absorbs impact acting on the person outside the vehicle, in the state of wrapping the person outside the vehicle falling over obliquely rearward, from right and left.

As described above, in this embodiment, the exterior airbag device 17 is expanded when the collision detector predicts or detects contact. The exterior airbag device 17 expands the bag body 21 over the outer surface of the vehicle body 2 of the automobile 1. Thus, the exterior airbag device 17 enables avoiding a direct collision of the person outside the vehicle with the vehicle body 2 by the use of the bag body 21 that is expanded over the outer surface of the vehicle body 2 of the automobile 1.

At this time, the bag body 21 is expanded rearward from the front part of the vehicle body 2 so as to overlie the hood 5 of the vehicle body 2 of the automobile 1, in the state of being engaged with the plurality of the engaging members 26 that are arranged in the vehicle width direction at the front part of the vehicle body 2. The bag body 21 may have the engaging hole 23 so as to engage with the engaging member 26, which stands on the surface of the front part of the vehicle body 2. This allows the expanded bag body 21 to be deformed by the weight of the person outside the vehicle riding thereonto, in such a manner as to wrap the person outside the vehicle, from right and left. In particular, the bag body 21 engages with the plurality of the engaging members 26 and is expanded rearward from the front part of the vehicle body 2 while having a wide width corresponding to the vehicle width of the vehicle body 2. Thus, the bag body 21 resists a rearward load acting thereon, in the state of wrapping the person outside the vehicle, from right and left.

In addition, at least the engaging members 26 at both ends in the vehicle width direction among the plurality of the engaging members 26 are disengageable from the bag body 21 when a load component in the vehicle width direction acts on the bag body 21. Thus, even when the person outside the vehicle falls obliquely over the expanded bag body 21, the engagement with the engaging member 26 on a side in the falling over direction is released. As a result, the person outside the vehicle, who falls obliquely over the bag body 21, can be wrapped from right and left, in a manner similar to that in the case of falling over the bag body 21 along the front-rear direction.

This makes the body of the person outside the vehicle falling over the expanded bag body 21 hardly fall off from the expanded bag body 21, even when the person outside the vehicle falls obliquely over the bag body 21. The person outside the vehicle, who is avoided from having a direct collision with the vehicle body 2 by the expanded bag body 21, can be prevented from moving from the expanded bag body 21.

In this embodiment, the right and left engaging holes 23 in the vehicle width direction each has the first hole 24 and the second hole 25. The first hole 24 has a diameter approximately equal to or smaller than that of the engaging member 26 and engages with the engaging member 26 at the start of expanding the bag body 21. The second hole 25 is positioned outward in the vehicle width direction from the first hole 24 and has a diameter larger than the engaging member 26. The first hole 24 and the second hole 25 communicate with each other.

In the situation in which only a rearward load acts on the bag body 21, the engaging member 26 is maintained in the state of being engaged with the first hole 24, and this engagement is not released. In this case, the bag body 21 does not come off and move rearward although receiving the rearward load. The bag body 21 supports the load applied from the person outside the vehicle, in a wrapping manner at the initial position.

In another situation in which an oblique rearward load acts on the bag body 21, the engaging member 26 on the load direction side moves from the first hole 24 to the second hole 25 and is released from the engagement with the engaging hole 23. In this case, the bag body 21 can rotate to prevent the person outside the vehicle falling thereover from moving further outside.

Next, the exterior protection apparatus 10 of the automobile 1 according to a second embodiment of the disclosure will be described. In this embodiment, the same reference signs are used for configurations similar to those in the above-described embodiment, and illustration and description thereof will be omitted. The following description will focus on differences from the above-described embodiment.

Figure 9A:
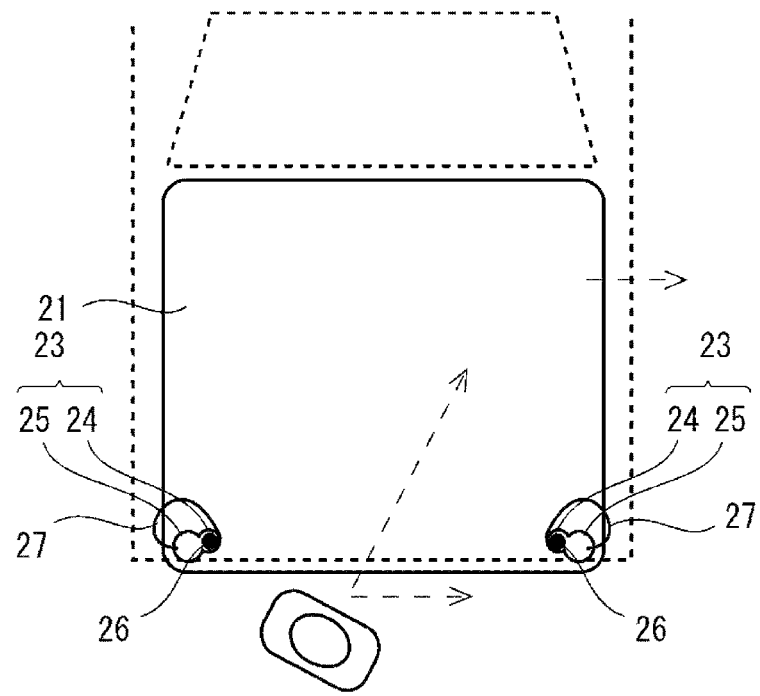
FIGS. 9A and 9B are diagrams of the bag body of the exterior airbag device according to a second embodiment.
Figure 9B:
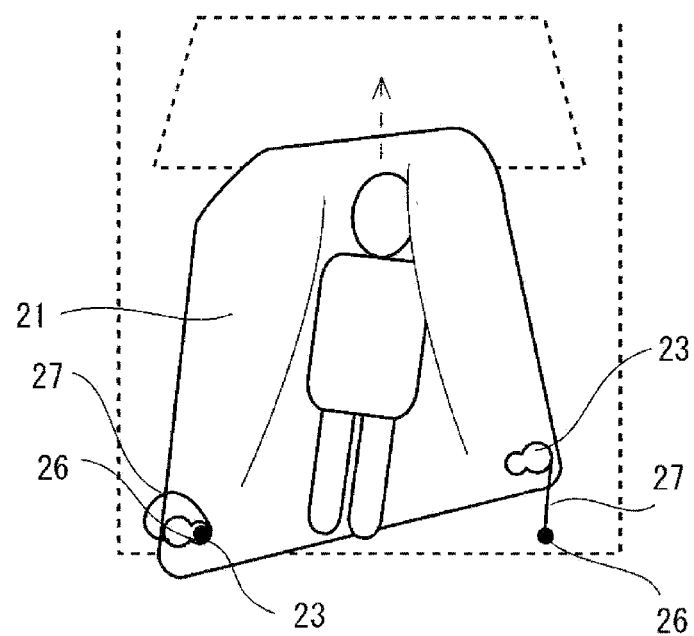

FIGS. 9A and 9B are diagrams of the bag body 21 of the exterior airbag device 17 according to the second embodiment.

In the exterior airbag device 17 in FIGS. 9A and 9B, paired engaging holes 23 are respectively provided at right and left ends of the approximately quadrangular wide bag body 21. Each of the engaging holes 23 at the right and left ends has a first hole 24 and a second hole 25 that communicates with the first hole 24, as in the case of the above-described embodiment.

The left engaging hole 23 and the left engaging member 26 that stands on the vehicle body 2 are coupled to each other by a tether 27. The right engaging hole 23 and the right engaging member 26 that stands on the vehicle body 2 are coupled to each other by a tether 27.

In FIG. 9A, the person outside the vehicle falls obliquely rearward over the approximately quadrangular wide bag body 21. In this case, due to the action of a leftward load component in the vehicle width direction, a strong force acts on the part on the left side from the center in the vehicle width direction of the bag body 21. When the person outside the vehicle falls over the bag body 21, the left engaging hole 23 on the side of the falling over direction of the bag body 21 is released from the engagement with the left engaging member 26. The left engaging hole 23 becomes movable rearward from the position of the left engaging member 26 by the length of the tether 27. The left part of the bag body 21, which is released from the engagement from the engaging member 26, does not move rearward by a predetermined amount based on the length of the tether 27 or greater. The approximately quadrangular wide bag body 21 that is expanded to the maximum is then compressed by the weight of the person outside the vehicle, who falls thereover, and so on. The bag body 21 is compressed while discharging the injected gas. Thereafter, the approximately quadrangular wide bag body 21 finally rotates rearward to prevent the person outside the vehicle from further moving in the vehicle width direction and deforms in such a manner as to wrap the person outside the vehicle falling thereover, from right and left, as illustrated in FIG. 9B.

At this time, the approximately quadrangular wide bag body 21, which is expanded rearward from the front part of the vehicle body 2 while being supported based on the right and left engaging members 26, resists an oblique rearward load acting thereon.

Thus, the approximately quadrangular wide bag body 21 absorbs impact acting on the person outside the vehicle, in the state of wrapping the person outside the vehicle falling over obliquely rearward, from right and left.

As described above, in this embodiment, each of the both side parts of the bag body 21 is coupled to the vehicle body 2 by the corresponding tether 27. In one embodiment, the tether 27 may serve as a "coupler". Thus, the bag body 21 is not displaced rearward by the length of the coupler or longer. The part of the bag body 21 on the side of the engaging member 26 that is disengaged is limited in rearward movement by the length of the coupler. This facilitates maintaining the bag body 21 in the state of being extended in the vehicle width direction although the engagement is released. Even when the weight of the person outside the vehicle is great, the bag body 21 is expected to support the human body by wrapping the human body, from right and left, from the extended state.

Although the tether 27 is used as the coupler in this embodiment, any member that has flexibility enough to withstand load can be used as the coupler.

Next, the exterior protection apparatus 10 of the automobile 1 according to a third embodiment of the disclosure will be described. In this embodiment, the same reference signs are used for configurations similar to those in the above-described embodiment, and illustration and description thereof will be omitted. The following description will focus on differences from the above-described embodiment.

Figure 10A:
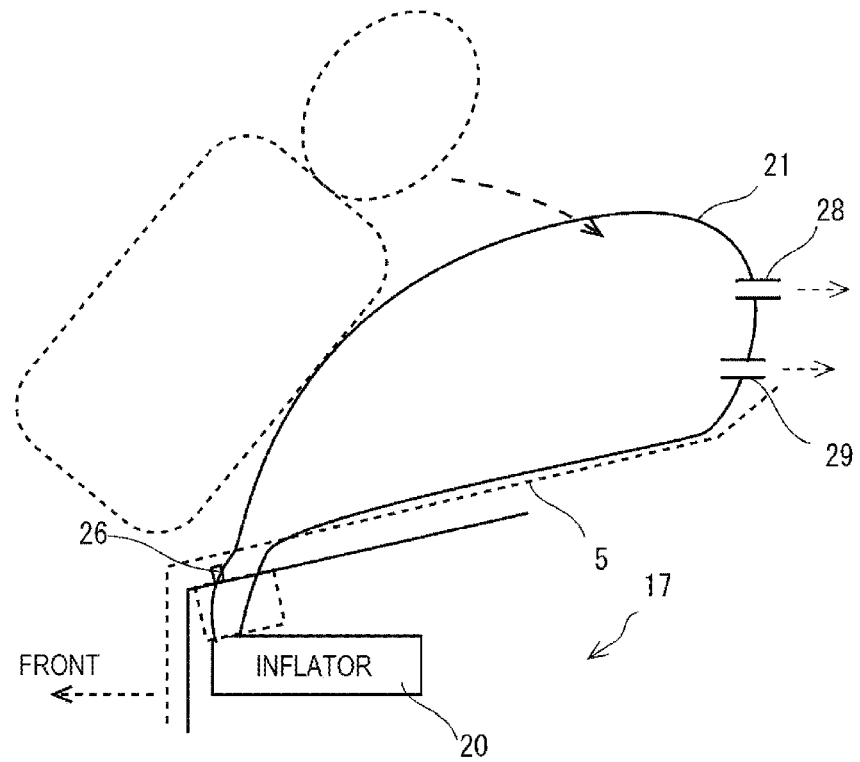
FIGS. 10A and 10B are diagrams of the bag body of the exterior airbag device according to a modification of the second embodiment.
Figure 10B:
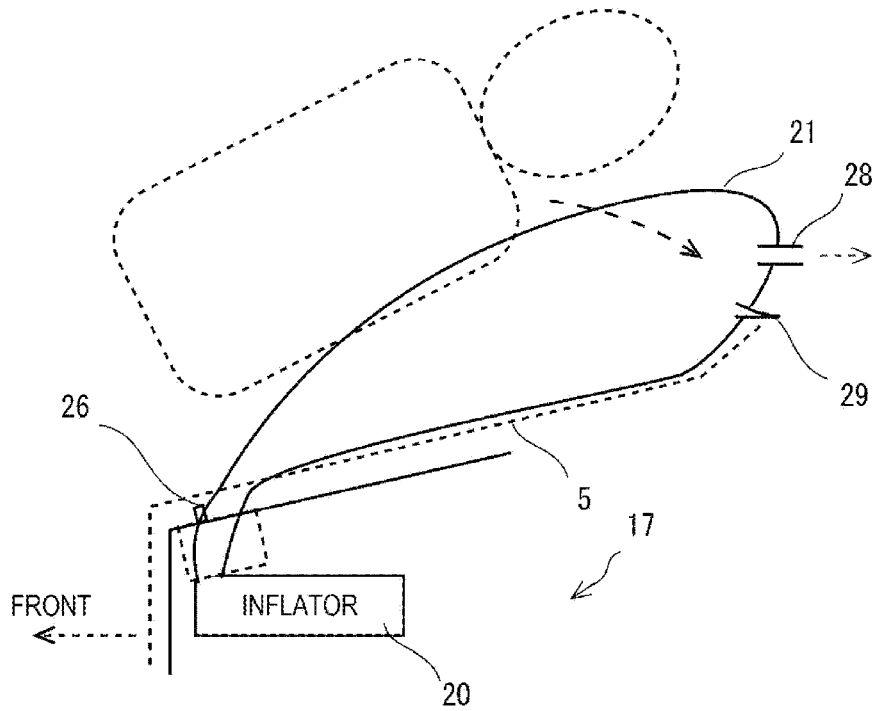

FIGS. 10A and 10B are diagrams of the bag body 21 of the exterior airbag device 17 according to the third embodiment.

The exterior airbag device 17 of this embodiment is basically similar to that in the first embodiment. However, the bag body 21 includes a first discharge valve 28 and a second discharge valve 29. The first discharge valve 28 and the second discharge valve 29 are provided at a rear part of the bag body 21. The second discharge valve 29 is different from an ordinary discharge valve, such as the first discharge valve 28, and is formed of a thermally fusible material. The second discharge valve 29 may be formed of a material having a characteristic of being fused by heat at approximately 100 degrees Celsius, for example.

In this case, the high-temperature high-pressure gas, which is jetted into the bag body 21 by the inflator 20, inflates the bag body 21. This gas is partially discharged from the expanded bag body 21 through the first discharge valve and the second discharge valve 29. The pressure and temperature of the gas that is discharged from the bag body 21 is maintained high due to the action of the weight of the person outside the vehicle. As a result, the second discharge valve 29, which is formed of a thermally fusible material, is exposed to the high-temperature high-pressure gas for a predetermined time and is thus fused, whereby the second discharge valve 29 ceases discharging the gas. The amount of the gas that is discharged from the bag body 21 is reduced. The bag body 21 is reduced in pressure more gradually than immediately before the weight of the person outside the vehicle acts thereon.

This makes the approximately quadrangular wide bag body 21 easily deform in such a manner as to wrap the person outside the vehicle falling over thereon, from right and left. The bag body 21 is not completely compressed before wrapping the person outside the vehicle falling thereover, from right and left.

As described above, in this embodiment, the second discharge valve 29, which is provided in the bag body 21 so as to discharge the high-temperature high-pressure gas that is jetted thereinto by the inflator 20, is thermally fused and is closed by exposure to a predetermined amount or more of heat. The second discharge valve 29 is thermally fused and is closed by exposure to a predetermined amount or more of heat due to the action of the weight of the person outside the vehicle. With this structure, the discharge amount or discharge speed of the high-pressure gas from the bag body 21 is decreased after the weight of the person outside the vehicle acts. As a result, for example, when the bag body 21 that is slightly deflated from the maximum expanded condition is continuously applied with the weight of the person outside the vehicle, the bag body 21 is easily inflated at the right and left sides of the part where the body weight acts, by the remaining gas. Thus, the bag body easily deforms in such a manner as to wrap the person outside the vehicle falling thereover, from right and left.

The above embodiments are mere examples of the disclosure. It is noted that the disclosure is not limited to the above embodiments. Various modifications and changes may be made without departing from the gist of the disclosure.

In one example, in the above-described embodiments, the engagement between the engaging hole 23 and the engaging member 26 is released by impetus of the person outside the vehicle, who has fallen obliquely over the approximately quadrangular wide bag body 21.

Alternatively, in another example, the approximately quadrangular wide bag body 21 may be actively released at the engaging hole 23 from the engagement with the engaging member 26, based on oblique falling over of the person outside the vehicle.

Figure 11A:
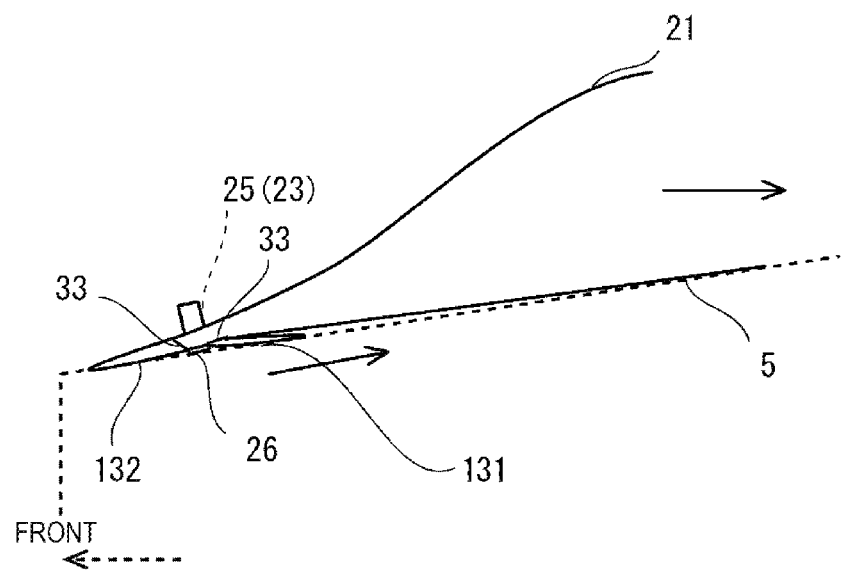
FIGS. 11A and 11B are enlarged schematic diagrams of a part around an engaging hole 23 of an approximately quadrangular wide bag body 21 according to a modification of the above-described embodiments.
Figure 11B:
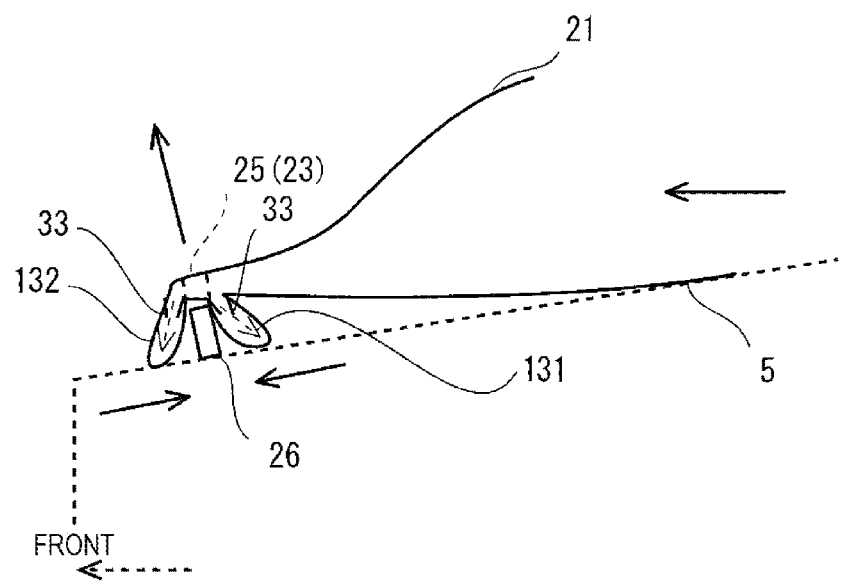

FIGS. 11A and 11B are enlarged schematic diagrams of a part around an engaging hole 23 of an approximately quadrangular wide bag body 21 according to a modification of the above-described embodiments.

The bag body 21 in FIGS. 11A and 11B includes a rear tongue 131 and a front tongue 132 around the engaging hole 23.

The rear tongue 131 protrudes downward from a lower surface of the bag body 21, behind the engaging hole 23.

The front tongue 132 protrudes downward from the lower surface of the bag body 21, in front of the engaging hole 23.

The rear tongue 131 and the front tongue 132 may be made longer than the engaging member 26.

In addition, a pressure valve 33 is provided in each of an inlet of the rear tongue 131 and an inlet of the front tongue 132. The rear tongue 131 and the front tongue 132 are partitioned from the rest of the bag body 21 by the pressure valves 33.

In these conditions, for example, when a person outside the vehicle rearwardly falls over, a rearward force continuously acts on the engaging hole 23, as described in relation to FIGS. 6A and 6B. In this case, as illustrated in FIG. 11A, the rear tongue 131 and the front tongue 132 are maintained in the state of being approximately flat under the expanded bag body 21, while being partitioned from the rest of the bag body 21 by the pressure valves 33. The engagement between the engaging hole 23 and the engaging member 26 is continuously maintained.

On the other hand, for example, when a person outside the vehicle falls over obliquely rearward, a forward force may act on the engaging hole 23 (refer to FIG. 8A), as described in relation to FIGS. 7A to 8B. In this case, as illustrated in FIG. 11B, the forward force acts on the rear tongue 131 and the front tongue 132 in such a manner that they rise on the hood 5 around the engaging member 26. These movements open the pressure valves 33. The rear tongue 131 and the front tongue 132 are inflated and are maintained in the rising state by the high-pressure gas that flows thereinto through the pressure valves 33. The second hole 25 of the engaging hole 23 comes away from the hood 5 while being supported by the rising rear tongue 131 and front tongue 132. The engagement between the engaging hole 23 and the engaging member 26 becomes easily releasable.

Figure 12:
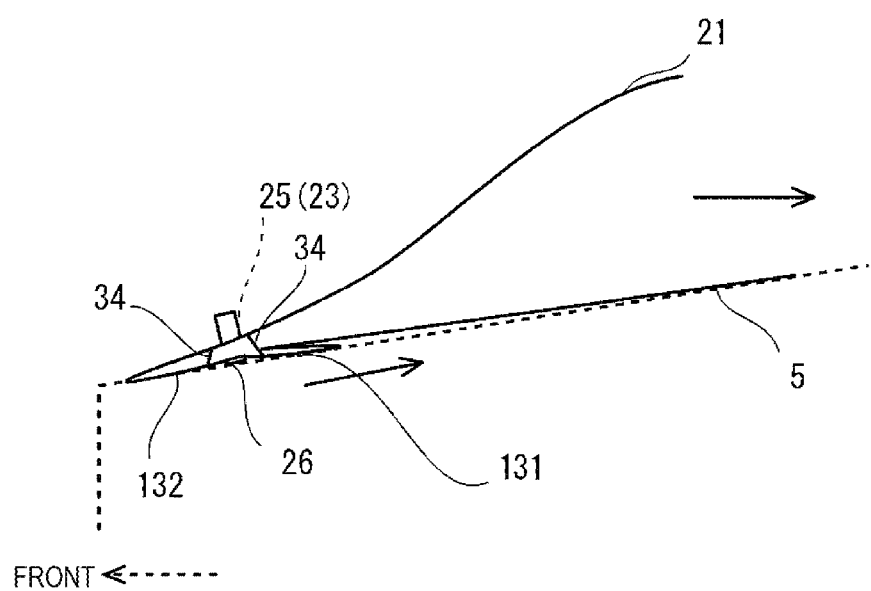
FIG. 12 is an enlarged schematic diagram of the modification in FIGS. 11A and 11B.

In order to not expand the rear tongue 131 and the front tongue 132 in the case in FIG. 11A, for example, a tether for maintaining the rear tongue 131 and the front tongue 132 in the flat state may be used instead of the above method. In one example, as illustrated in FIG. 12, a tether 34 is coupled to the bag body 21 at one end and be coupled to the rear tongue 131 or the front tongue 132 at the other end. When the bag body 21 is pulled rearward, as illustrated in FIG. 11A, the rear tongue 131 and the front tongue 132 are maintained in the flat state as in the case in FIG. 11A. On the other hand, when the bag body 21 is about to move forward, as illustrated in FIG. 11B, the tether 34 breaks. The break of the tether 34 expands the rear tongue 131 and the front tongue 132 freely. Thus, the rear tongue 131 and the front tongue 132 are expanded around the engaging member 26 and rise on the hood 5, as in the case of FIG. 11B.

In the disclosure, the exterior airbag device is expanded when the collision detector predicts or detects contact. The exterior airbag device expands the bag body over the outer surface of the vehicle body. Thus, the exterior airbag device enables avoiding a direct collision of the person outside the vehicle with the vehicle body by the use of the bag body that is expanded over the outer surface of the vehicle body.

At this time, the bag body is expanded rearward from the front part of the vehicle body so as to overlie the hood of the vehicle body, in the state of being engaged with the plurality of the engaging members that are arranged in the vehicle width direction at the front part of the vehicle body. The bag body may have the engaging hole so as to engage with the engaging member, which stands on the surface of the front part of the vehicle body. This allows the expanded bag body to be deformed by the weight of the person outside the vehicle riding thereonto, in such a manner as to wrap the person outside the vehicle, from right and left. In particular, the bag body engages with the plurality of the engaging members and is expanded rearward from the front part of the vehicle body while having a wide width corresponding to the vehicle width of the vehicle body. Thus, the bag body resists a rearward load acting thereon, in the state of wrapping the person outside the vehicle, from right and left.

In addition, at least the engaging member 26 at both ends in the vehicle width direction among the plurality of the engaging members are disengageable from the bag body when a load component in the vehicle width direction acts on the bag body. In response to disengagement between the engaging member on the side of falling over direction and the bag body, the bag body becomes movable in such a manner as to rotate rearward around the engaging member that is still engaged. Thus, the person outside the vehicle, who has fallen obliquely over the expanded bag body and is about to further move in the falling over direction due to inertia, hardly moves further outward in the vehicle width direction, due to the bag body rotating rearward accordingly. The person outside the vehicle easily moves rearward of the vehicle.

In particular, an outer part of the position of the expanded bag body where the person outside the vehicle falls over, is disengaged from the engaging member and is thus hardly continuously pulled in the front-rear direction. This facilitates maintaining the expanded bag body in the state of being inflated in such a manner as to be higher than the body of the person outside the vehicle falling thereover. Thus, the expanded bag body is expected to serve as a bank for preventing the person outside the vehicle falling thereover from moving further outward. The person outside the vehicle falling thereover can be wrapped in the part of the bag body 21 that is still inflated on the outer side of the person. As a result, the person outside the vehicle, who falls obliquely over the bag body, can be wrapped from right and left, in a manner similar to that in the case of falling over the bag body along the front-rear direction.

With this structure, the body of the person outside the vehicle, who has fallen over the expanded bag body, is, for example, wrapped in the bag body from right and left, even when falling obliquely over the expanded bag body. Thus, the body of the person outside the vehicle who has fallen over the expanded bag body hardly falls off from the expanded bag body, even when the person further moves. The person outside the vehicle, who is avoided from having a direct collision with the vehicle body by the expanded bag body, can be prevented from moving right and left of the expanded bag body.

The controller 18 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 18 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIG. 2.

The invention claimed is:

1. An exterior protection apparatus for a vehicle, the exterior protection apparatus comprising:
   an exterior airbag device comprising
      a bag body, and
      an inflator configured to expand the bag body rearward from a front part of a vehicle body of the vehicle in such a manner as to overlie a hood of the vehicle body;
   a collision detector configured to predict or detect contact between the vehicle body and a movable body;
   a controller configured to cause the exterior airbag device to be expanded in a case where the collision detector predicts or detects the contact; and
   engaging members disposed in a vehicle width direction at the front part of the vehicle body, the engaging members being configured to engage with the bag body in a case the bag body is expanded rearward from the front part of the vehicle body, wherein
   at least the engaging members at both ends in the vehicle width direction among the engaging members are disengageable from the bag body in a case where a load component in the vehicle width direction acts on the bag body.

2. The exterior protection apparatus for a vehicle according to claim 1, wherein
   the bag body is configured to be expanded rearward from the front part of the vehicle body, and the bag body has a wide width corresponding to a vehicle width of the vehicle body and engages with the engaging members, so as to resist a rearward load acting on the bag body.

3. The exterior protection apparatus for a vehicle according to claim 1, wherein
the engaging members stand at the front part of the vehicle body and are disposed in the vehicle width direction, and
the bag body comprises engaging holes configured to engage with the engaging members.

4. The exterior protection apparatus for a vehicle according to claim 1, wherein
the engaging members stand at the front part of the vehicle body and are disposed in the vehicle width direction, and
the bag body comprises engaging holes configured to engage with the engaging members.

5. The exterior protection apparatus for a vehicle according to claim 3, wherein
the engaging holes comprises
first holes configured to engage with the engaging members when the bag body is expanded, and
second holes that communicate with the first holes,
the second holes are disposed on an outer side in the vehicle width direction from the first hole, and
the second holes have diameters larger than the engaging members.

6. The exterior protection apparatus for a vehicle according to claim 4, wherein
the engaging holes comprises
first holes configured to engage with the engaging members when the bag body is expanded, and
second holes that communicate with the first holes,
the second holes are disposed on an outer side in the vehicle width direction from the first hole, and
the second holes have diameters larger than the engaging members.

7. The exterior protection apparatus for a vehicle according to claim 1, further comprising:
couplers that couple respective side parts of the bag body to the vehicle body so that the side part of the bag body which is disengaged from the engaging member does not move rearward by a predetermined amount or greater.

8. The exterior protection apparatus for a vehicle according to claim 2, further comprising:
couplers that couple respective side parts of the bag body to the vehicle body so that the side part of the bag body which is disengaged from the engaging member does not move rearward by a predetermined amount or greater.

9. The exterior protection apparatus for a vehicle according to claim 3, further comprising:
couplers that couple respective side parts of the bag body to the vehicle body so that the side part of the bag body which is disengaged from the engaging member does not move rearward by a predetermined amount or greater.

10. The exterior protection apparatus for a vehicle according to claim 4, further comprising:
couplers that couple respective side parts of the bag body to the vehicle body so that the side part of the bag body which is disengaged from the engaging member does not move rearward by a predetermined amount or greater.

11. The exterior protection apparatus for a vehicle according to claim 5, further comprising:
couplers that couple respective side parts of the bag body to the vehicle body so that the side part of the bag body which is disengaged from the engaging member does not move rearward by a predetermined amount or greater.

12. The exterior protection apparatus for a vehicle according to claim 6, further comprising:
couplers that couple respective side parts of the bag body to the vehicle body so that the side part of the bag body which is disengaged from the engaging member does not move rearward by a predetermined amount or greater.

13. The exterior protection apparatus for a vehicle according to claim 1, further comprising:
a discharge valve provided in the bag body so as to discharge high-temperature high-pressure gas that is to be jetted into the bag body by the inflator, the discharge valve being configured to be closed by exposure to a predetermined amount or more of heat.

14. The exterior protection apparatus for a vehicle according to claim 2, further comprising:
a discharge valve provided in the bag body so as to discharge high-temperature high-pressure gas that is to be jetted into the bag body by the inflator, the discharge valve being configured to be closed by exposure to a predetermined amount or more of heat.

15. The exterior protection apparatus for a vehicle according to claim 3, further comprising:
a discharge valve provided in the bag body so as to discharge high-temperature high-pressure gas that is to be jetted into the bag body by the inflator, the discharge valve being configured to be closed by exposure to a predetermined amount or more of heat.

16. The exterior protection apparatus for a vehicle according to claim 4, further comprising:
a discharge valve provided in the bag body so as to discharge high-temperature high-pressure gas that is to be jetted into the bag body by the inflator, the discharge valve being configured to be closed by exposure to a predetermined amount or more of heat.

17. The exterior protection apparatus for a vehicle according to claim 5, further comprising:
a discharge valve provided in the bag body so as to discharge high-temperature high-pressure gas that is to be jetted into the bag body by the inflator, the discharge valve being configured to be closed by exposure to a predetermined amount or more of heat.

18. The exterior protection apparatus for a vehicle according to claim 6, further comprising:
a discharge valve provided in the bag body so as to discharge high-temperature high-pressure gas that is to be jetted into the bag body by the inflator, the discharge valve being configured to be closed by exposure to a predetermined amount or more of heat.

19. An exterior protection apparatus for a vehicle, the exterior protection apparatus comprising:
an exterior airbag device comprising
a bag body, and
an inflator configured to expand the bag body rearward from a front part of a vehicle body of the vehicle in such a manner as to overlie a hood of the vehicle body;
a collision detector configured to predict or detect contact between the vehicle body and a movable body, the collision detector including at least a camera or a sensor for detecting the contact between the vehicle body and the movable body;

circuitry configured to cause the exterior airbag device to be expanded in a case where the collision detector predicts or detects the contact; and engaging members disposed in a vehicle width direction at the front part of the vehicle body, the engaging members being configured to engage with the bag body in a case the bag body is expanded rearward from the front part of the vehicle body, wherein at least the engaging members at both ends in the vehicle width direction among the engaging members are disengageable from the bag body in a case where a load component in the vehicle width direction acts on the bag body.

* * * * *